United States Patent
Song et al.

(10) Patent No.: US 11,615,636 B2
(45) Date of Patent: Mar. 28, 2023

(54) APPARATUS AND METHOD FOR DOCUMENT RECOGNITION

(71) Applicant: SAMSUNG SDS CO., LTD., Seoul (KR)

(72) Inventors: Hyo Seob Song, Seoul (KR); Jeong Yoon, Seoul (KR); Joon Seok Lee, Seoul (KR); Soo Ah Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 325 days.

(21) Appl. No.: 17/148,895

(22) Filed: Jan. 14, 2021

(65) Prior Publication Data
US 2022/0121843 A1 Apr. 21, 2022

(30) Foreign Application Priority Data
Oct. 16, 2020 (KR) .................. 10-2020-0133945

(51) Int. Cl.
*G06V 30/414* (2022.01)
*H04N 1/60* (2006.01)
*G06V 30/10* (2022.01)

(52) U.S. Cl.
CPC ......... *G06V 30/414* (2022.01); *H04N 1/6016* (2013.01); *G06V 30/10* (2022.01)

(58) Field of Classification Search
CPC .......... G06V 30/414; G06V 30/19173; G06V 30/416; G06V 30/32; G06V 30/10; G06V 30/19127; G06V 10/22; G06V 10/454; G06V 10/56; G06V 10/7715; G06V 10/469; H04N 1/6016; G06F 18/213; G06N 3/08
See application file for complete search history.

(56) References Cited

U.S. PATENT DOCUMENTS

| | | | |
|---|---|---|---|
| 5,872,864 A | 2/1999 | Imade et al. | |
| 8,429,163 B1 * | 4/2013 | Ahmadullin | G06F 16/93 382/305 |
| 9,342,741 B2 * | 5/2016 | Amtrup | G06V 30/40 |
| 10,769,503 B1 | 9/2020 | Buhler et al. | |
| 2006/0218138 A1 * | 9/2006 | Weare | G06F 16/38 707/999.005 |
| 2015/0269433 A1 | 9/2015 | Amtrup et al. | |

(Continued)

FOREIGN PATENT DOCUMENTS

| CN | 108460420 A | * 8/2018 |
|---|---|---|
| JP | 2004349940 A | * 12/2004 |
| KR | 10-2019-0131631 A | 11/2019 |

OTHER PUBLICATIONS

Translation of JP2004349940 (Year: 2004).*
(Continued)

*Primary Examiner* — Carol Wang
(74) *Attorney, Agent, or Firm* — The PL Law Group, PLLC

(57) ABSTRACT

An apparatus for document recognition according to an embodiment includes a document type analyzer that analyzes a type of a recognition target document based on document feature vector extracted from one or more partial images obtained by color space conversion of one or more partial regions of the recognition target document, and an information extractor that extracts value information from one or more information search images organized in a grid form based on a position of key information of the recognition target document.

24 Claims, 8 Drawing Sheets

(56) References Cited

U.S. PATENT DOCUMENTS

2016/0328610 A1* 11/2016 Thompson .......... G06F 16/5838
2019/0258854 A1* 8/2019 Hosabettu ............ G06V 30/414
2019/0294874 A1 9/2019 Orlov et al.
2020/0097718 A1* 3/2020 Schäfer ............ G06V 30/18057

OTHER PUBLICATIONS

Translation of CN108460420 (Year: 2018).*
European Search Report For EP 21155204.7 dated Jun. 30, 2021 from European patent office in a counterpart European patent application.
European Search Report For EP 21155204.7 dated Oct. 13, 2021 from European patent office in a counterpart European patent application.

* cited by examiner

FIG. 5

| | 500 |
|---|---|
| 511 | TYPE OF DEPOSIT: CORPORATE FREE SAVINGS DEPOSIT / A/C NO.: 000-000-0000000 / AMOUNT/B/A: [KRW *0] / AMOUNT OF UNCLEARED CHECKS & BILLS / NO. OF SHARES HELD/SALES VALUE: N.A / EXCHANGE RATE/NET ASSET VALUE / WITHDRAWAL RESTRICTIONS |
| 513 | TYPE OF DEPOSIT: CORPORATE FREE SAVINGS DEPOSIT / A/C NO.: 000-003-0000000 / AMOUNT/B/A: [KRW *0] / AMOUNT OF UNCLEARED CHECKS & BILLS / NO. OF SHARES HELD/SALES VALUE: N.A / EXCHANGE RATE/NET ASSET VALUE / WITHDRAWAL RESTRICTIONS |
| 515 | TYPE OF DEPOSIT: CORPORATE FREE SAVINGS DEPOSIT / A/C NO.: 000-012-0000000 / AMOUNT/B/A: [KRW *0] / AMOUNT OF UNCLEARED CHECKS & BILLS / NO. OF SHARES HELD/SALES VALUE: N.A / EXCHANGE RATE/NET ASSET VALUE / WITHDRAWAL RESTRICTIONS |
| 517 | TYPE OF DEPOSIT: CURRENT DEPOSIT / A/C NO.: 000-002-0000000 / AMOUNT/B/A: [KRW *0] / AMOUNT OF UNCLEARED CHECKS & BILLS / NO. OF SHARES HELD/SALES VALUE: N.A / EXCHANGE RATE/NET ASSET VALUE / WITHDRAWAL RESTRICTIONS |
| 519 | TYPE OF DEPOSIT: CURRENT DEPOSIT / A/C NO.: 004-004-004004 / AMOUNT/B/A: [KRW *0] / AMOUNT OF UNCLEARED CHECKS & BILLS / NO. OF SHARES HELD/SALES VALUE: N.A / EXCHANGE RATE/NET ASSET VALUE / WITHDRAWAL RESTRICTIONS |
| | TOTAL AMOUNT / TOTAL AMOUNT OF UNCLEARED CHECKS&BILLS |

510

APPARATUS AND METHOD FOR DOCUMENT RECOGNITION

CROSS-REFERENCE TO RELATED APPLICATION(S)

This application claims the benefit under 35 USC § 119(a) of Korean Patent Application No. 10-2020-0133945, filed on Oct. 16, 2020, in the Korean Intellectual Property Office, the entire disclosure of which is incorporated herein by reference for all purposes.

BACKGROUND

1. Field

The following description relates to a technology for document recognition.

2. Description of Related Art

In the document recognition technology in the related art, a method of checking whether or not a character or word matching a desired character or word exists in a document by using character recognition has been mainly used. However, the above method involves the assumption that the character recognition result is accurate.

As other methods for document recognition, there are methods in which image features are used. However, in the related art, only reduced images or partial images are used that are obtained from an original document color of which is not converted, and thus there is a problem in that an error occurs in document recognition when the color of the original document is changed into black and white in the process of input and delivery.

SUMMARY

Embodiments disclosed herein provide a method and an apparatus for analyzing a document type and extracting a key-value by using a feature vector of a document image generated by color space conversion.

In one general aspect, there is provided an apparatus for document recognition including a document type analyzer that analyzes a type of a recognition target document based on document feature vector extracted from one or more partial images obtained by color space conversion of one or more partial regions of the recognition target document, and an information extractor that extracts value information from one or more information search images organized in a grid form based on a position of key information of the recognition target document.

The document type analyzer may detect at least one of one or more characters and one or more figures in one or more regions of the recognition target document, extract a character of which at least one of a font size and a thickness is greater than a corresponding one of an average font size and an average thickness, by comparing at least one of font sizes and thicknesses of the one or more detected characters, or extract a character positioned within a predetermined distance from the one or more detected figures by measuring distances between the one or more detected characters and the one or more detected figures, and determine a tag of the recognition target document based on the extracted character.

The document type analyzer may generate one or more images for one or more partial regions by reducing the recognition target document or dividing the recognition target document with a predetermined rule, and generate one or more partial images by applying, to each of the one or more images for the one or more partial regions, one or more color space conversion methods for performing conversion to a black-and-white image.

The document type analyzer may extract feature maps for the one or more partial images by using a convolutional neural network, and generate the document feature vector by encoding the extracted feature maps into binary strings.

The document type analyzer may analyze a similarity between the document feature vector of the recognition target document and a document feature vector of another recognition target document stored in advance and having same tag as tag of the recognition target document, and store the tag and the document feature vector of the recognition target document when the similarity is less than or equal to a predetermined standard.

The document type analyzer may analyze the similarity by giving a weight to each of document feature vectors extracted from the one or more partial images.

The document type analyzer may analyze a similarity between the document feature vector of the recognition target document and document feature vectors of one or more other recognition target documents stored in advance for each of one or more document types, and determine, as a document type of the recognition target document, a document type corresponding to a recognition target document having the highest similarity among the one or more other recognition target documents stored in advance for each of the one or more document types.

The information extractor may extract an initial key feature vector and initial key position information by extracting a key information image from an information region for a key selected by user, set a key search section based on the initial key position information, and search for one or more pieces of key information within the key search section based on the initial key feature vector.

The information extractor may extract an information search image for a predetermined unit of key periphery information consisting of at least one of characters, numbers, and symbols positioned in at least one of up, down, right, and left directions with respect to a position of the key information searched for within the key search section, and organize the information search image in a grid form.

The information extractor may search for key information by analyzing a similarity between the initial key feature vector and a feature vector of the key periphery information included in the information search image.

The information extractor may extract the value information based on format information of a value corresponding to the key selected by the user, and the format information may be an arrangement order of at least one of characters, numbers, and symbols constituting the value.

The information extractor may extract format information of the key periphery information included in the information search image, and extract the value information by comparing the extracted format information of the key periphery information with the format information of the value.

The information extractor may search for second key periphery information that partially matches the format information of the value by comparing another key periphery information adjacent to first key periphery information including format information that partially matches the format information of the value with the format information of the value, when the first key peripheral information is searched for, and extract the value information by merging the first key periphery information and the second key periphery information.

In another general aspect, there is provided a method for document recognition including analyzing a type of a recognition target document based on a document feature vector extracted from one or more partial images obtained by color space conversion of one or more partial regions of the recognition target document, and extracting value information from one or more information search images organized in a grid form based on a position of key information of the recognition target document.

The analyzing of the document type may include detecting at least one of one or more characters and one or more figures in one or more regions of the recognition target document, extracting a character of which at least one of a font size and a thickness is greater than a corresponding one of an average font size and an average thickness, by comparing at least one of font sizes and thicknesses of the one or more detected characters, or extracting a character positioned within a predetermined distance from the one or more detected figures by measuring distances between the one or more detected characters and the one or more detected figures, and determining a tag of the recognition target document based on the extracted character.

The analyzing of the document type may include generating one or more images for one or more partial regions by reducing the recognition target document or dividing the recognition target document with a predetermined rule, and generating the one or more partial images by applying, to each of the one or more images for the one or more partial regions, one or more color space conversion methods for performing conversion to a black-and-white image.

The analyzing of the document type may include extracting feature maps for the one or more partial images by using a convolutional neural network, and generating the document feature vector by encoding the extracted feature maps into binary strings.

The analyzing of the document type may include analyzing a similarity between the document feature vector of the recognition target document and a document feature vectors of another recognition target document stored in advance and having same tag as tag of the recognition target document, and storing the tag and the document feature vector of the recognition target document when the similarity is less than or equal to a predetermined standard.

The analyzing of the document type may include analyzing the similarity by giving a weight to each of document feature vectors extracted from the one or more partial images.

The analyzing of the document type may include analyzing a similarity between the document feature vector of the recognition target document and document feature vectors of one or more other recognition target documents stored in advance for each of one or more document types, and determining, as a document type of the recognition target document, a document type corresponding to a recognition target document having the highest similarity among the one or more other recognition target documents stored in advance for each of the one or more document types.

The extracting of the value information may include extracting an initial key feature vector and initial key position information by extracting a key information image from an information region for a key selected by user, setting a key search section based on the initial key position information, and searching for one or more pieces of key information within the key search section based on the initial key feature vector.

The extracting of the value information may include extracting an information search image for a predetermined unit of key periphery information unit consisting of at least one of characters, numbers, and symbols positioned in at least one of up, down, right, and left directions with respect to a position of the key information searched for within the key search section, and organizing the information search image in a grid form.

The extracting of the value information may include searching for key information by analyzing a similarity between the initial key feature vector and a feature vector of the key periphery information included in the information search image.

The extracting of the value information may include extracting the value information based on format information of a value corresponding to the key selected by the user, and the format information may be an arrangement order of at least one of characters, numbers, and symbols constituting the value.

The extracting of the value information may include extracting the format information of the key periphery information included in the information search image, and extracting value information by comparing the extracted format information of the key periphery information with the format information of the value.

The extracting of the value information may include searching for second key periphery information that partially matches the format information of the value by comparing another key periphery information adjacent to first key periphery information including format information that partially matches the format information of the value with the format information of the value, when the first key peripheral information is searched for, and extracting the value information by merging the first key periphery information and the second key periphery information.

With embodiments disclosed herein, it is possible to reduce the influence of color and contamination of an input document by analyzing a document type and extracting a key-value by using a feature vector of a document image generated by color space transformation.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 5 is an exemplary diagram for describing a method for searching for key information according to an embodiment.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only for illustrative purposes and the present invention is not limited thereto.

In describing the embodiments of the present invention, when it is determined that detailed descriptions of known technology related to the present invention may unnecessarily obscure the gist of the present invention, the detailed descriptions thereof will be omitted. The terms used below are defined in consideration of functions in the present invention, but may be changed depending on the customary practice or the intention of a user or operator. Thus, the definitions should be determined based on the overall content of the present specification. The terms used herein are only for describing the embodiments of the present invention, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
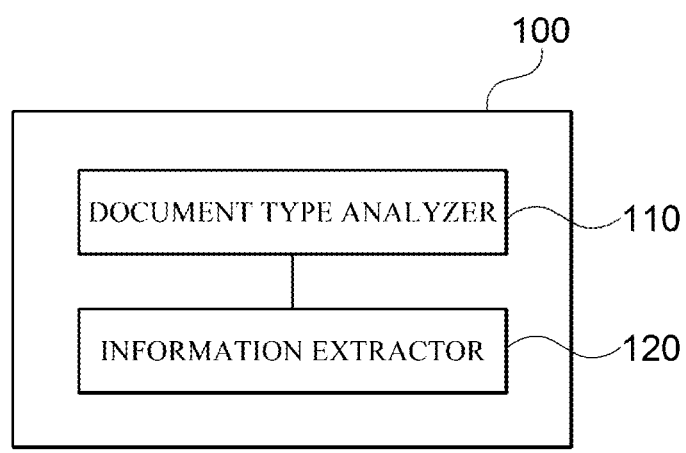
FIG. 1 is a configuration diagram of an apparatus for document recognition according to an embodiment.

FIG. 1 is a configuration diagram of an apparatus for document recognition according to an embodiment.

Referring to FIG. 1, an apparatus 100 for document recognition may include a document type analyzer 110 for analyzing a document type and an information extractor 120 for extracting information in a document.

According to an embodiment, the document type analyzer 110 may analyze the type of a recognition target document based on document feature vector extracted from one or more partial images obtained by color space conversion of one or more partial regions of the recognition target document.

According to an embodiment, the information extractor 120 may extract value information from one or more information search images organized in a grid form based on the position of key information of the recognition target document.

Figure 2:
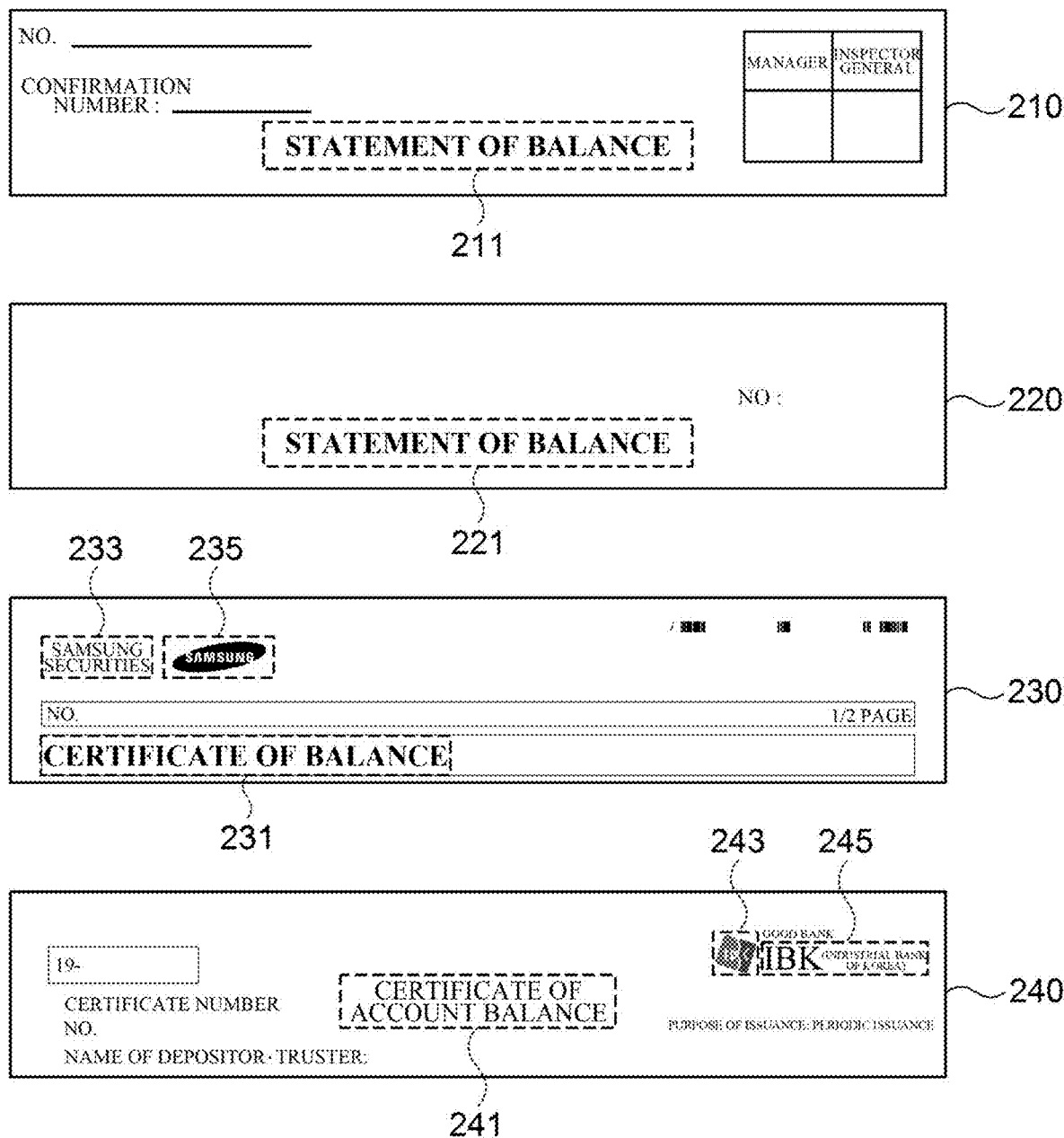
FIG. 2 is an exemplary diagram for describing a method for determining a tag according to an embodiment.

FIG. 2 is an exemplary diagram for describing a method for determining a tag according to an embodiment.

According to an embodiment, the document type analyzer 110 may detect at least one of one or more characters and one or more figures in one or more regions of a recognition target document.

Referring to FIG. 2, recognition target documents 210, 220, 230, and 340 may include characters or figures for indicating the type of document. Accordingly, the document type analyzer 110 may extract characters and figures positioned in the recognition target documents 210, 220, 230, and 340 in order to determine a tag of the document.

For example, the recognition target document 210 may include characters such as "NO., Confirmation Number, Statement of Balance, Certificate of Deposit, Money Trust Balance, Average Balance, Manager, Inspector General", and the document type analyzer 110 may extract the above-mentioned characters from the document.

For example, the document type analyzer 110 may extract, from the recognition target documents 230 and 240, predetermined figures 235 and 243 together with characters.

According to an embodiment, the document type analyzer 110 may extract a character of which at least one of a font size and a thickness is greater than a corresponding one of an average font size and an average thickness, by comparing at least one of font sizes and thicknesses of the one or more detected characters.

For example, for the recognition target document 210, the document type analyzer 110 may extract "Statement of Balance 211" of which the font size and thickness are the greatest, among those of characters including "NO., Confirmation Number, Statement of Balance, Certificate of Deposit, Money Trust Balance, Average Balance, Manager, Inspector General".

According to an embodiment, the document type analyzer 110 may extract a character positioned within a predetermined distance from the one or more detected figures by measuring distances between the one or more detected characters and the one or more detected figures.

For example, for the recognition target document 230, the document type analyzer 110 may extract the characters, "Certificate of Balance 231", based on the font size and thickness, and may extract the characters, "Samsung Securities 233", based on the fact that one or more characters 233 and one or more figures 235 positioned within the predetermined distance.

According to an embodiment, the document type analyzer 110 may determine a tag of the recognition target document based on the extracted characters.

According to an example, the document type analyzer 110 may determine the tag of the recognition target document 210 as "Statement of Balance" based on the characters extracted from the recognition target document 210. For another example, the document type analyzer 110 may determine the tag as "Certificate of Balance-Samsung Securities" based on characters extracted from the recognition target document 230.

According to an embodiment, the document type analyzer 110 may generate the tag by adding a serial number when the tags are identical but image features are different. For example, for the recognition target document 210 and the recognition target document 220, the tags are the same as "Certificate of Balance", but the image features are different, and thus the document type analyzer 110 may determine the tag of the recognition target document 210 as "Certificate of Balance-1", and the tag of the recognition target document 220 as "Certificate of Balance-2".

Figure 3:
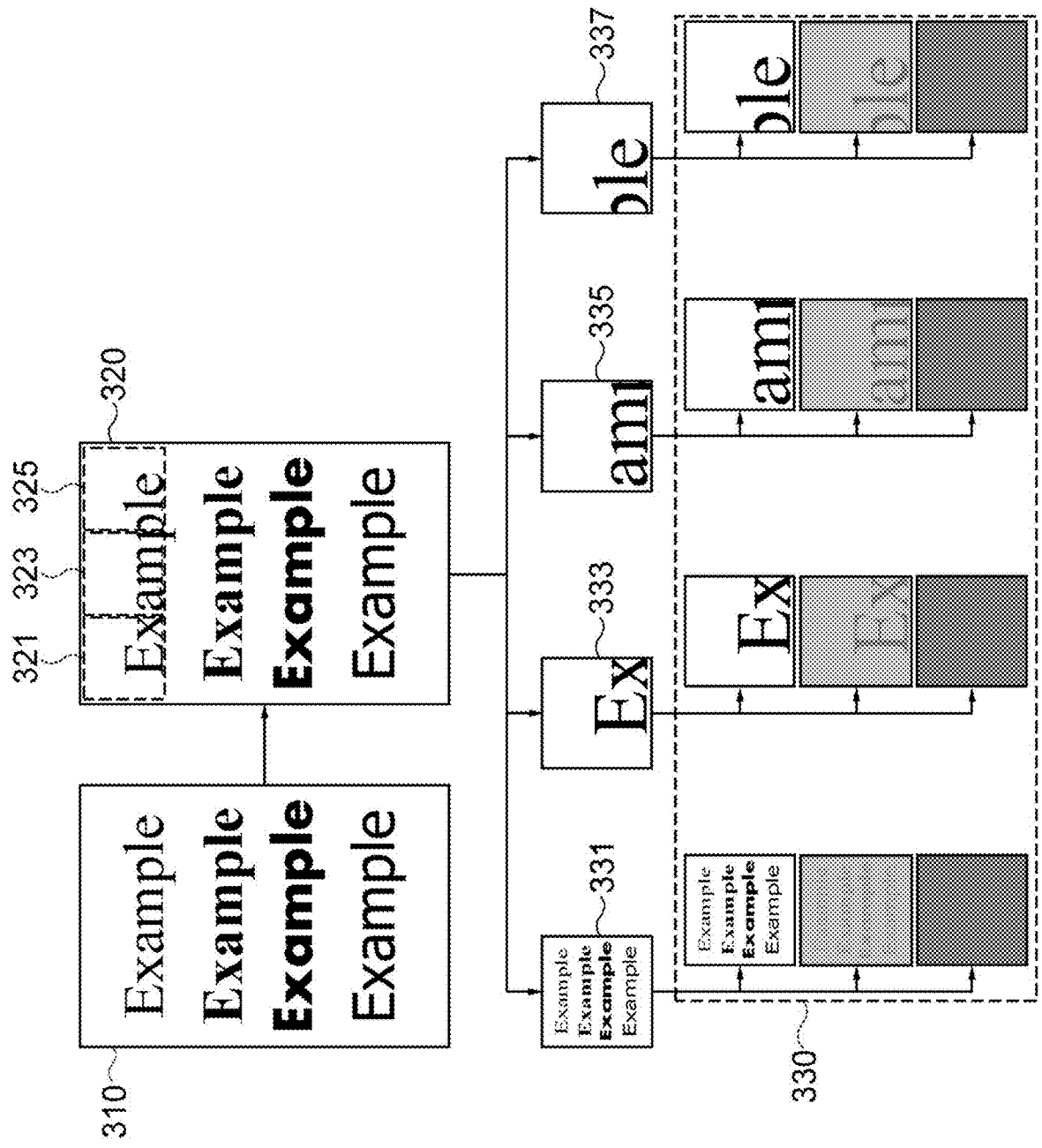
FIG. 3 is an exemplary diagram for describing a method for generating a partial image according to an embodiment.

FIG. 3 is an exemplary diagram for describing a method for generating a partial image according to an embodiment.

According to an embodiment, the document type analyzer 110 may generate images for one or more partial regions by reducing the recognition target document 310 or dividing the recognition target document 310 with a predetermined rule, and may generate one or more partial images by applying, to each of the images for the one or more partial regions, one or more color space conversion methods for performing conversion to a black-and-white image.

Referring to FIG. 3, the document type analyzer 110 may generate a recognition target document 320 by removing a margin of the document for analysis of the recognition target document 310.

According to an example, the document type analyzer 110 may generate a partial image 331 by reducing the recognition target document 320.

According to an example, the document type analyzer 110 may generate partial images of one or more partial regions of the recognition target document 320. Referring to FIG. 3, the document type analyzer 110 may generate one or more partial images 333, 335, and 337 of one or more predetermined portions 321, 323, and 325 of the recognition target document 320.

According to an example, the document type analyzer 110 may generate one or more partial images by applying, to each of the images for the one or more partial regions, one or more color space conversion methods for performing conversion to a black-and-white image. Referring to FIG. 3, the document type analyzer 110 may generate one or more partial images 340 by applying one or more color space conversion methods to the partial images 331, 333, 335, and 337.

According to an example, when a document is recognized, even a color document may be sent by black-and-white fax or scanned in black and white. Accordingly, even if the input document is a color document, it is difficult to classify the document type only with color. On the other hand, when the input document is converted into a black and white image regardless of the presence or absence of color in the input document, the influence of color and contamination of the input document may be reduced.

Figure 4:
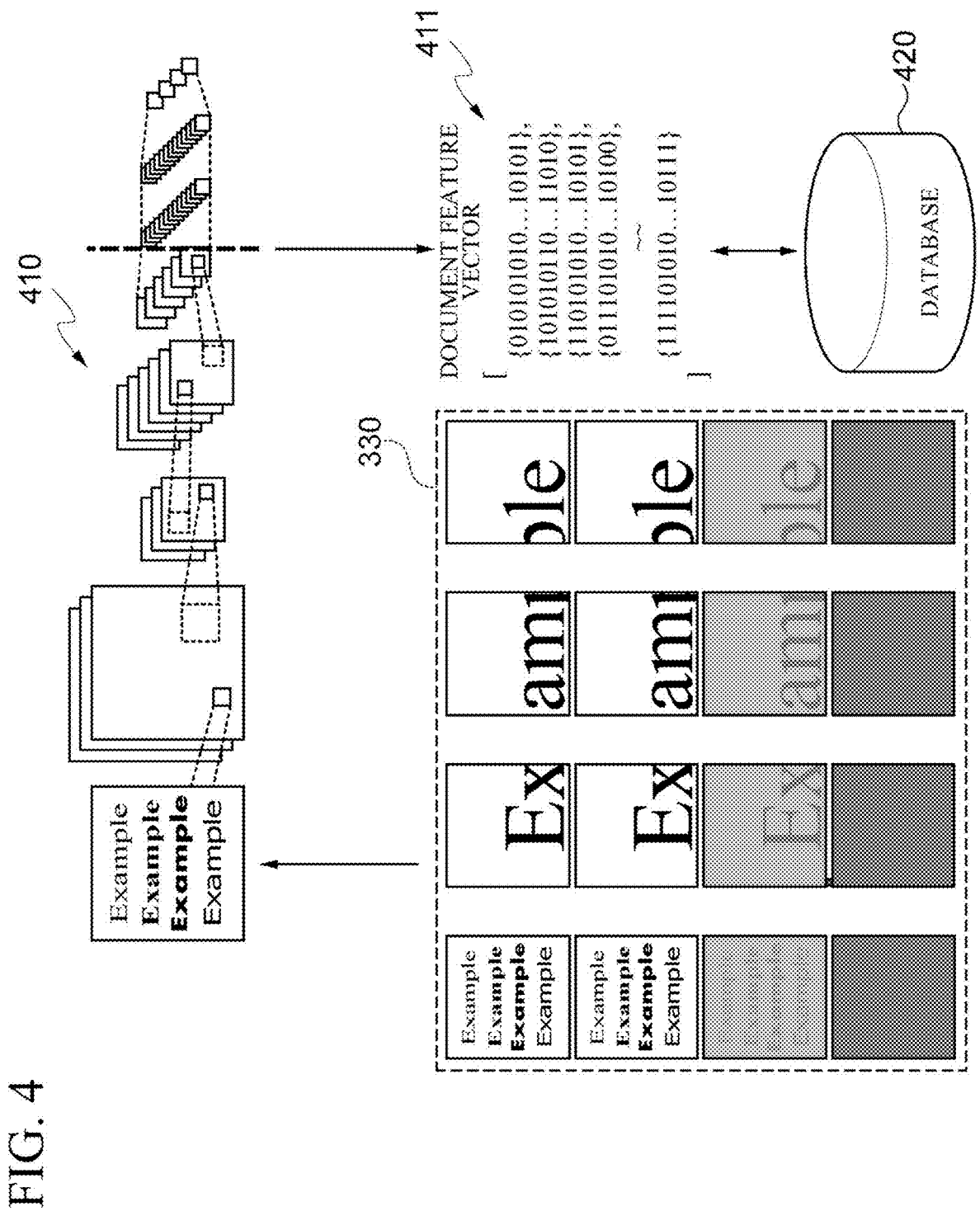
FIG. 4 is an exemplary diagram for describing a method for generating a feature vector according to an embodiment.

FIG. 4 is an exemplary diagram for describing a method for generating a feature vector according to an embodiment.

According to an embodiment, the document type analyzer 110 may extract feature maps for one or more partial images by using a convolutional neural network, and may generate document feature vectors by encoding the extracting feature maps into binary strings.

Referring to FIG. 4, the document type analyzer 110 may input one or more partial images 330 into the convolutional neural network. For example, the convolutional neural network may perform convolution on each of the one or more partial images 330 and may generate a feature map by using the convolutional value. For example, the feature map may be generated prior to a fully connected layer stage in the process of the convolutional neural network.

According to an example, the document type analyzer 110 may generate a document feature vector 411 by encoding the feature map into a binary string. For example, the document type analyzer 110 may generate the feature vector simply by using a method for changing a bit into a number or a run-length encoding.

According to an embodiment, the document type analyzer 110 may analyze a similarity between a document feature vector of another recognition target document stored in advance and having the same tag as that of the recognition target document and a document feature vector of the recognition target document.

For example, when the document feature vector for the input target document 210 of FIG. 2 is stored in a database 420, the document type analyzer 110 may analyze the similarity by comparing the feature vector of the input target document 220 with the feature vector of the input target document 210 having the same tag when analyzing the input target document 220.

According to an example, the document type analyzer 110 may calculate the similarity by using the feature vector for each partial image registered together with the tag information stored in the database 420. For example, the document type analyzer 110 may calculate the similarity by using an XOR calculation for each bit of the feature vector, or using a Euclidean distance, a Manhattan distance, a Minkowski distance, a cosine similarity, or the like.

According to an embodiment, the document type analyzer 110 may store the tag and the document feature vector of the recognition target document, when the similarity is less than or equal to a predetermined standard. For example, the document type analyzer 110 may store the feature vector of the input target document 220 in the database 420 when the similarity between the feature vector of the input target document 210 and the feature vector of the input target document 220 is less than or equal to a predetermined standard.

According to an embodiment, the document type analyzer 110 may arrange the feature vectors obtained by encoding image feature information for each extracted partial image in the order of positions of the partial images, and may store the feature vector in the database 420 together with the document type tag.

For example, the document type analyzer 110 may not store the feature vector of the input target document 220 in the database 420 to prevent repeated inputs, when the similarity between the feature vector of the input target document 210 and the feature vector of the input target document 220 is equal to or greater than a predetermined standard.

According to an embodiment, the document type analyzer 110 may analyze the similarity by giving a weight to each of the document feature vectors extracted from one or more partial images.

According to an example, the document type analyzer 110 may give different weights depending on the converted type of the image. For example, as shown in Table 1, the document type analyzer 110 may create configurations for analysis by giving different weights depending on the image type of the document, such as the original document, the entire color conversion document, a color conversion factor 1, a color conversion factor 2, and a color conversion factor 3.

TABLE 1

| Configuration method | Original | Entire color conversion | Color conversion factor 1 | Color conversion factor 2 | Color conversion factor 3 |
|---|---|---|---|---|---|
| 1 | 1 | — | — | — | — |
| 2 | — | 1 | — | — | — |
| 3 | 1 | 1 | 3/5 | 1/5 | 1/5 |
| 4 | 1 | 1 | 1/5 | 3/5 | 1/5 |
| . . . | | | | | |
| N | 1 | 1 | 1/5 | 1/5 | 3/5 |

According to an embodiment, the document type analyzer 110 may analyze the similarity between the document feature vector of the recognition target document and document feature vectors of one or more other recognition target documents stored in advance for each of one or more document types, and may determine, as the document type of the recognition target document, the document type corresponding to a recognition target document having the highest similarity among the one or more other recognition target documents stored in advance for each of the one or more document types.

According to an example, the document type analyzer 110 may have one or more feature vectors for the "Statement of Balance" in the database 420. Then, the document type analyzer 110 may receive the input target document 210, extract the feature vector of the input target document 210, and analyze the similarity between the extracted feature vector and the one or more feature vectors for "Statement of Balance" stored in the database 420. For example, the document type analyzer 110 may determine the document type of the input target document 210 as "Statement of Balance" when the similarity between the one or more feature vectors for "Statement of Balance" stored in the database 420 and the feature vector of the input target document 210 is equal to or greater than a predetermined standard.

FIG. 5 is an exemplary diagram for describing a method for searching for key information according to an embodiment.

According to an embodiment, the information extractor 120 may extract an initial key feature vector and initial key position information by extracting a key information image from an information region for a key selected by the user.

For example, the information extractor 120 may extract one or more information regions from the input target document 500 and may receive an input for selecting any one of the one or more information regions from the user.

According to an example, the information extractor 120 may extract a key information image from an information region for a key selected by a user. For example, the information extractor 120 may receive an input for selecting one information region 511 and extract a key information image from the corresponding information region 511. Then, the information extractor 120 may extract the initial key feature vector and the initial key position information from the key information image.

According to an embodiment, the information extractor 120 may set a key search section based on the initial key position information.

According to an example, the information extractor 120 may extract the initial key position information corresponding to the information region 511, and may set the left region of the document in which the information region 511 is positioned as a search section 510. For example, the search section 510 may be part or all of a document.

According to an embodiment, the information extractor 120 may search for one or more pieces of key information within the key search section based on an initial key feature vector.

According to an example, the information extractor 120 may extract an image for a predetermined unit of information consisting of at least one of characters, numbers, and symbols within the search section, and may extract a feature vector from the image. Then, the information extractor 120 may search for key information by analyzing the similarity between the initial key feature vector and the feature vector extracted from the image for the predetermined unit of information.

For example, as illustrated in FIG. 5, information regions 513, 515, 517, and 519 having the same key information may be searched for by extracting feature information for "Amount/B/A" (B/A stands for Balance Amount) which is the key information included in the information region 511 selected by the user and analyzing the similarity with the feature vector extracted from the image for the predetermined unit of information.

Figure 6:
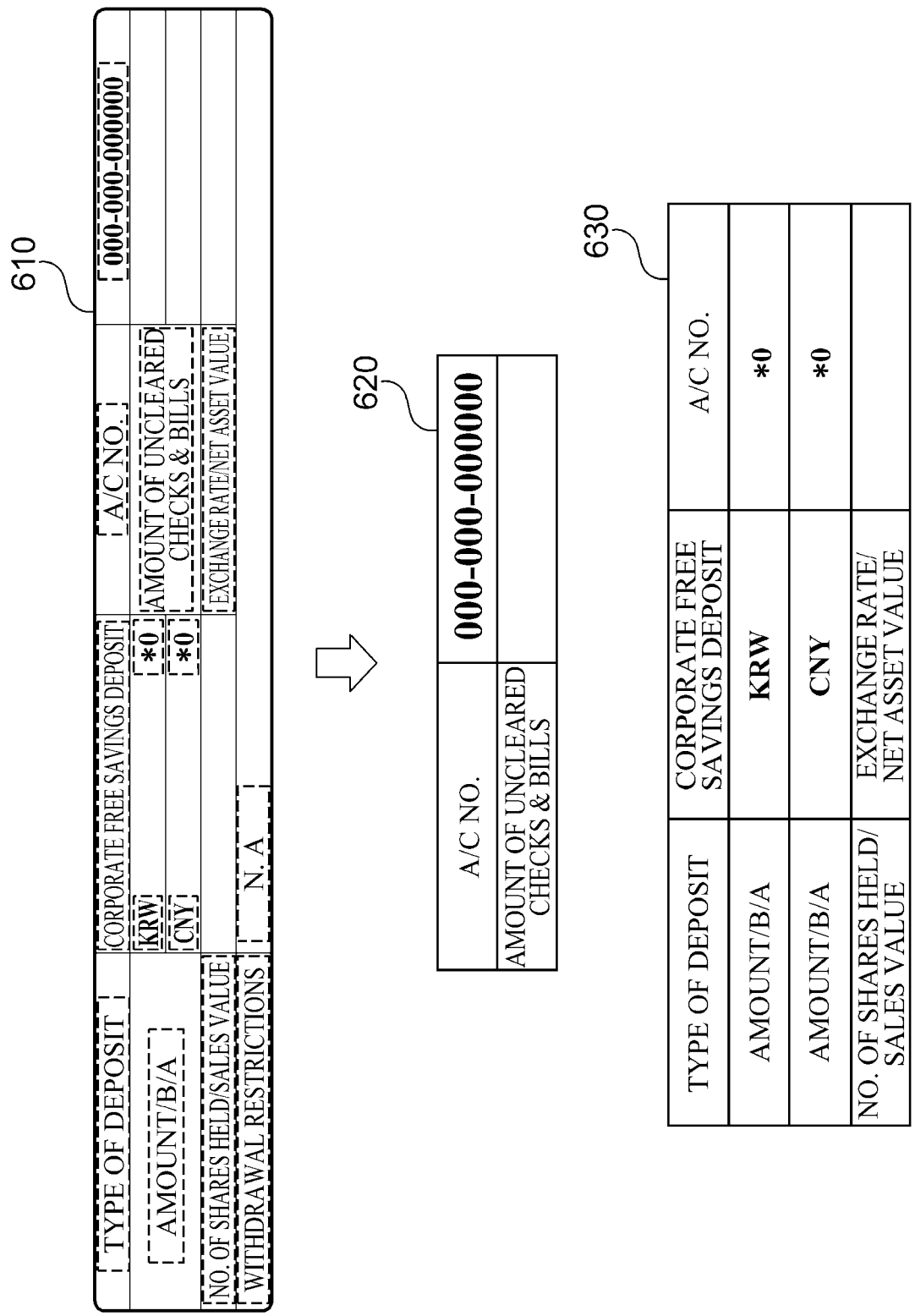
FIG. 6 is an exemplary diagram for describing a method for generating an information search image in a grid form according to an embodiment.

FIG. 6 is an exemplary diagram for describing a method for generating an information search image in a grid form according to an embodiment.

According to an embodiment, the information extractor 120 may extract an information search image for a predetermined unit of key periphery information consisting of at least one of characters, numbers, and symbols positioned in at least one of up, down, right, and left directions with respect to a position of the key information searched for within the key search section, and organize the information search image in a grid form.

Referring to FIG. 6, the information extractor 120 may extract an information search image for a predetermined unit of key periphery information consisting of at least one of characters, numbers, and symbols around the position of key information searched for in an input target document 610.

For example, when the selected key is "Amount/B/A", the information extractor 120 may extract one or more information search images (dotted region) positioned in a predetermined direction of "Amount/B/A".

According to an example, the information extractor 120 may generate information in a grid form using one or more extracted information search images. For example, when the selected key is "A/C No." (which stands for Account Number), the information extractor 120 may extract the information search image positioned in one space in the "down" direction and one space in the "right" direction of the corresponding key, generating a grid form 620.

According to an example, the information extractor 120 may generate information in a grid form using one or more extracted information search images. For example, when the selected key is "Amount/B/A", the information extractor 120 may extract the information search image located in one space in the "up" direction, one space in the "down" direction, and two spaces in the "right" direction of the corresponding key, generating a grid form 630.

According to an example, when a plurality of information search images for specific information exist in the same direction, the information extractor 120 may form a grid by repeating information images for keys as many as the number of the identical information search images. For example, for the information search images "KRW" and "CNY" in the grid form 630, "KRW" and "CNY" exist in the same direction, that is, in the "right" direction in the key image, and thus the information extractor 120 may repeat the image of "Amount/B/A", which is the key information image, twice to organize the grid form 630.

According to an embodiment, the information extractor 120 may extract value information based on format information of a value corresponding to a key selected by the user.

According to an example, the format information may be an arrangement order of at least one of characters, numbers, and symbols constituting a value. For example, when the value to be extracted is a date, the format information may have a date format such as "dd/mm/yyyy", "mm/dd/yyyy", and "yyyy/mm/dd".

According to an embodiment, the information extractor 120 may extract the format information of the key periphery information included in the information search image, and extract the value information by comparing the extracted format information of the key periphery information with the format information of the value.

For example, the key information may be "A/C No.", and the format information of a value corresponding to A/C No. may be "NNNSNNNSNNNNNN" (N: number, S: symbol).

According to an example, the information extractor 120 may extract format information in the periphery of the key by analyzing the grid form 620 for "A/C No.". For example, for "000-000-000000", which is the periphery information in the "right" direction of the key, the format information may be "NNNSNNNSNNNNNN", and the periphery information in the "down" direction may be "HHHHHHHHHH" (H: Korean letter (Hangul)).

According to an example, the information extractor 120 may compare "NNNSNNNSNNNNNN," which is the format information of A/C No., with "NNNSNNNSNNNNNN" and "HHHHHHHHHH", which are the format information of the periphery information, and may extract "000-000-000000" having the format information corresponding to the format information of the account number, as the value information.

According to an embodiment, the information extractor 120 may search for second key periphery information that partially matches the format information of the value by comparing another key periphery information adjacent to first key periphery information including format information that partially matches the format information of the value with the format information of the value, when the first key peripheral information is searched for, and extract the value information by merging the first key periphery information and the second key periphery information.

For example, the key information may be "Amount/B/A", and the format information of the corresponding value may be "EEESN" (E: English, N: number, S: symbol).

According to an example, the information extractor 120 may extract format information in the periphery of the key by analyzing the grid form 630 for "Amount/B/A". For example, for "KRW", which is the periphery information in the "right" direction of the key, the format information may be "EEE".

According to an example, the information extractor 120 may compare "EEESN", which is the format information of "Amount/BA", with "EEE", which is the format information of the periphery information, and thus it can be seen that the format information of the periphery information partially matches "EEESN", which is the format information of "Amount/BA". In this case, the information extractor 120 may proceed in the same direction as "KRW", which is the periphery information, to extract and compare format information of the periphery information of "*0".

For example, since the format information is "SN" for "*0", it can be seen that it partially matches "EEESN", which is the format information of "Amount/B/A".

According to an example, the information extractor 120 may merge the format information "EEE" of "KRW" and the format information "SN" of "*0", and from the result of the merging, it can be seen that it matches "EEESN", which is the format information of "Amount/B/A". Then, the information extractor 120 may extract "KRW*0" as a value for the key information, "Amount/B/A".

Figure 7:
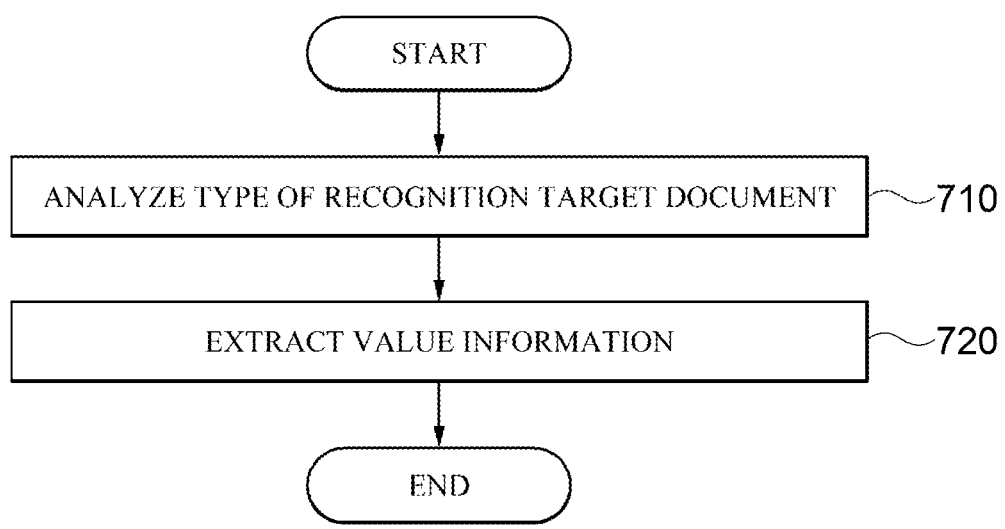
FIG. 7 is a flowchart of a method for document recognition according to an embodiment.

FIG. 7 is a flowchart of a method for document recognition according to an embodiment.

Referring to FIG. 7, the apparatus for document recognition may analyze the type of a recognition target document based on a document feature vector extracted from one or more partial images obtained by color space conversion of one or more partial regions of the recognition target document (710).

According to an embodiment, the apparatus for document recognition may detect at least one of one or more characters and one or more figures in one or more regions of a recognition target document.

According to an embodiment, the apparatus for document recognition may extract a character of which at least one of a font size and a thickness is greater than a corresponding one of an average font size and an average thickness, by comparing at least one of font sizes and thicknesses of the one or more detected characters.

According to an embodiment, the apparatus for document recognition may extract a character positioned within a predetermined distance from the one or more detected figures by measuring distances between the one or more detected characters and the one or more detected figures.

According to an embodiment, the apparatus for document recognition may determine a tag of the recognition target document based on the extracted characters.

According to an embodiment, the apparatus for document recognition may generate the tag by adding a serial number when the tags are identical but image features are different.

According to an embodiment, the apparatus for document recognition may generate images for one or more partial regions by reducing the recognition target document or dividing the recognition target document with a predetermined rule, and may generate one or more partial images by applying, to each of the images for the one or more partial regions, one or more color space conversion methods for performing conversion to a black-and-white image.

According to an example, the apparatus for document recognition may generate a partial image by reducing the recognition target document.

According to an example, the apparatus for document recognition may generate partial images of one or more partial regions of the recognition target document. As illustrated in FIG. 3, the apparatus for document recognition may generate one or more partial images of one or more predetermined portions of the recognition target document.

According to an example, the apparatus for document recognition may generate one or more partial images by applying, to each of the images for the one or more partial regions, one or more color space conversion methods for performing conversion to a black-and-white image.

According to an embodiment, the apparatus for document recognition may extract feature maps for one or more partial images by using a convolutional neural network, and may generate the document feature vector by encoding the extracted feature maps into binary strings.

According to an example, the apparatus for document recognition may input one or more partial images into the convolutional neural network. For example, the convolutional neural network may perform convolution on each of the one or more partial images and may generate feature maps by using the convolutional values. For example, the feature map may be generated prior to a fully connected layer stage in the process of the convolutional neural network.

According to an example, the apparatus for document recognition may generate document feature vectors by encoding the feature maps into binary strings. For example, the apparatus for document recognition may generate feature vectors simply by using a method for changing a bit into a number or a run-length encoding.

According to an embodiment, the apparatus for document recognition may analyze a similarity between document feature vectors of another recognition target document stored in advance and having the same tag as the recognition target document and document feature vectors of the recognition target document.

According to an example, the apparatus for document recognition may calculate the similarity by using the feature vector for each partial image registered together with the tag information stored in the database. For example, the apparatus for document recognition may calculate the similarity by using an XOR calculation for each bit of the feature vector, or using a Euclidean distance, a Manhattan distance, a Minkowski distance, a cosine similarity, or the like.

According to an embodiment, the apparatus for document recognition may store the tag and the document feature vector of the recognition target document, when the similarity is less than or equal to a predetermined standard. For example, the apparatus for document recognition may store the feature vectors of another input target document in the database when the similarity between the feature vectors of the input target document and the feature vectors of the other input target document is less than or equal to a predetermined standard.

According to an embodiment, the apparatus for document recognition may sort the feature vectors obtained by encoding image feature information for each extracted partial image in the order of positions of the partial images, and may store the feature vector in the database together with the document type tag.

For example, the apparatus for document recognition may not store the feature vectors of another input target document in the database to prevent repeated inputs, when the similarity between the feature vectors of the input target document and the feature vectors of the other input target document is equal to or greater than a predetermined standard.

According to an embodiment, the apparatus for document recognition may analyze the similarity by giving a weight to each of the document feature vectors extracted from one or more partial images.

According to an embodiment, the apparatus for document recognition may analyze the similarity between the document feature vector of the recognition target document and document feature vectors of one or more other recognition target documents stored in advance for each of one or more document types, and may determine, as the document type of the recognition target document, the document type corresponding to a recognition target document having the highest similarity among the one or more other recognition target documents stored in advance for each of the one or more document types.

According to an example, the apparatus for document recognition may have one or more feature vectors for the "Statement of Balance" in the database. Then, the apparatus for document recognition may receive the input target document, extract the feature vectors of the input target document, and analyze the similarity between the extracted feature vectors and the one or more feature vectors for "Statement of Balance" stored in the database. For example, the apparatus for document recognition may determine the document type of the input target document as "Statement of Balance" when the similarity between one or more feature vectors for "Statement of Balance" stored in the database and the feature vectors of the input target document is equal to or greater than a predetermined standard.

According to an embodiment, the apparatus for document recognition may extract value information from one or more information search images organized in a grid form based on the position of key information of the recognition target document (720).

According to an embodiment, the apparatus for document recognition may extract an initial key feature vector and initial key position information by extracting a key information image from an information region for a key selected by the user.

For example, the apparatus for document recognition may extract one or more information regions from the input target document and may receive an input for selecting any one of the one or more information regions from the user.

According to an example, the apparatus for document recognition may extract a key information image from an information region for a key selected by a user. For example, the apparatus for document recognition may receive an input for selecting one information region and extract a key information image from the corresponding information region. Then, the apparatus for document recognition may extract the initial key feature vector and the initial key position information from the key information image.

According to an embodiment, the apparatus for document recognition may set a key search section based on the initial key position information.

According to an example, the apparatus for document recognition may extract the initial key position information corresponding to the information region, and may set a predetermined region of the document in which the information region is positioned as the search section. For example, the search section may be part or all of a document.

According to an embodiment, the apparatus for document recognition may search for one or more pieces of key information within the key search section based on an initial key feature vector.

According to an example, the apparatus for document recognition may extract an image for a predetermined unit of information consisting of at least one of characters, numbers, and symbols within the search section, and may extract a feature vector from the image. Then, the apparatus for document recognition may search for key information by analyzing the similarity between the initial key feature vector and the feature vector extracted from the image for the predetermined unit of information.

According to an embodiment, the apparatus for document recognition may extract an information search image for the predetermined unit of key periphery information consisting of at least one of characters, numbers, and symbols positioned in at least one of up, down, right, and left directions with respect to a position of the key information searched for within the key search section, and organize the information search image in a grid form.

According to an example, the apparatus for document recognition may extract an information search image for the predetermined unit of key periphery information consisting of at least one of characters, numbers, and symbols around the position of key information searched for in an input target document.

According to an example, the apparatus for document recognition may generate information in a grid form using one or more extracted information search images.

According to an example, the apparatus for document recognition may generate information in a grid form using one or more extracted information search images.

According to an example, when a plurality of information search images for specific information exist in the same direction, the apparatus for document recognition may form a grid by repeating information images for keys as many as the number of the identical information search images.

According to an embodiment, the apparatus for document recognition may extract value information based on format information of a value corresponding to a key selected by the user.

According to an example, the format information may be an arrangement order of at least one of characters, numbers, and symbols constituting a value. For example, when the value to be extracted is a date, the format information may have a date format such as "dd/mm/yyyy", "mm/dd/yyyy", and "yyyy/mm/dd".

According to an embodiment, the apparatus for document recognition may extract the format information of the key periphery information included in the information search image, and extract the value information by comparing the extracted format information of the key periphery information with the format information of the value.

According to an embodiment, the apparatus for document recognition may search for second key periphery information that partially matches the format information of the value by comparing another key periphery information adjacent to first key periphery information including format information that partially matches the format information of the value with the format information of the value, when the first key peripheral information is searched for, and extract the value information by merging the first key periphery information and the second key periphery information.

Figure 8:
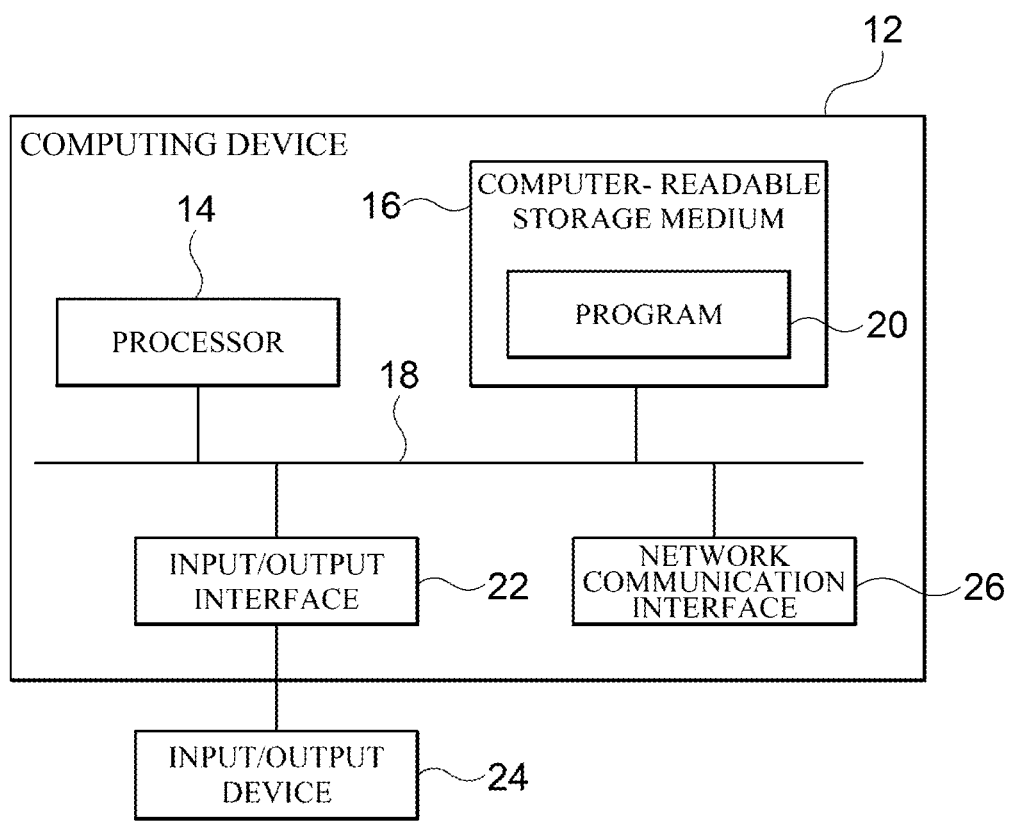
FIG. 8 is a block diagram for exemplarily illustrating a computing environment including a computing device according to an embodiment.

FIG. 8 is a block diagram for exemplarily illustrating a computing environment 10 including a computing device according to an embodiment.

In the illustrated embodiments, each component may have different functions and capabilities in addition to those described below, and additional components may be included in addition to those described below.

The illustrated computing environment 10 includes a computing device 12. In an embodiment, the computing device 12 may be one or more components included in the apparatus 120 for document recognition. The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touchpad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiments of the present invention may include a program for performing the methods described herein on a computer, and a computer-readable recording medium including the program. The computer-readable recording medium may include program instructions, a local data file, a local data structure, or the like alone or in combination. The media may be specially designed and configured for the present invention, or may be commonly used in the field of computer software. Examples of computer-readable recording media include magnetic media such as hard disks, floppy disks and magnetic tapes, optical recording media such as a CD-ROM and a DVD, and hardware devices specially configured to store and execute program instructions such as a ROM, a RAM, and a flash memory. Examples of the program may include not only machine language codes such as those produced by a compiler, but also high-level language codes that can be executed by a computer using an interpreter or the like.

Although the present invention has been described in detail through the representative embodiments as above, those skilled in the art will understand that various modifications may be made thereto without departing from the scope of the present invention. Therefore, the scope of rights of the present invention should not be limited to the described embodiments, but should be defined not only by the claims set forth below but also by equivalents of the claims.

What is claimed is:

1. An apparatus for document recognition comprising:
   a document type analyzer that analyzes a type of a recognition target document based on a document feature vector extracted from one or more partial images obtained by color space conversion of one or more partial regions of the recognition target document; and
   an information extractor that extracts value information from one or more information search images organized in a grid form based on a position of key information of the recognition target document,
   wherein the information extractor extracts an initial key feature vector and initial key position information by extracting a key information image from an information region for a key selected by a user;
   the information extractor sets a key search section based on the initial key position information; and
   the information extractor searches for one or more pieces of key information within the key search section based on the initial key feature vector.

2. The apparatus for document recognition of claim 1, wherein the document type analyzer generates images for the one or more partial regions by reducing the recognition target document or dividing the recognition target document with a predetermined rule; and
   the document type analyzer generates the one or more partial images by applying, to each of the images for the one or more partial regions, one or more color space conversion methods for performing conversion to a black-and-white image.

3. The apparatus for document recognition of claim 1, wherein the document type analyzer extracts feature maps for the one or more partial images by using a convolutional neural network; and the document type analyzer generates the document feature vector by encoding the extracted feature maps into binary strings.

4. The apparatus for document recognition of claim 1, wherein the document type analyzer analyzes a similarity between the document feature vector of the recognition target document and document feature vectors of one or more other recognition target documents stored in advance for each of one or more document types; and the document type analyzer determines, as a document type of the recognition target document, a document type corresponding to a recognition target document having the highest similarity among the one or more other recognition target documents stored in advance for each of the one or more document types.

5. The apparatus for document recognition of claim 1, wherein the information extractor extracts an information search image for a predetermined unit of key periphery information consisting of at least one of characters, numbers, and symbols positioned in at least one of up, down, right, and left directions with respect to a position of the key information searched for within the key search section; and the information extractor organizes the information search image in a grid form.

6. The apparatus for document recognition of claim 5, wherein the information extractor searches for key information by analyzing a similarity between the initial key feature vector and a feature vector of the key periphery information included in the information search image.

7. The apparatus for document recognition of claim 5, wherein the information extractor extracts the value information based on format information of a value corresponding to the key selected by the user; and the format information is an arrangement order of at least one of characters, numbers, and symbols constituting the value.

8. The apparatus for document recognition of claim 7, wherein the information extractor extracts format information of the key periphery information included in the information search image; and the information extractor extracts the value information by comparing the extracted format information of the key periphery information with the format information of the value.

9. The apparatus for document recognition of claim 8, wherein the information extractor searches for second key periphery information that partially matches the format information of the value by comparing another key periphery information adjacent to first key periphery information including format information that partially matches the format information of the value with the format information of the value, when the first key peripheral information is searched for; and the information extractor extracts the value information by merging the first key periphery information and the second key periphery information.

10. The apparatus for document recognition of claim 1, wherein the document type analyzer detects at least one of one or more characters and one or more figures in one or more regions of the recognition target document;

the document type analyzer extracts a character of which at least one of a font size and a thickness is greater than a corresponding one of an average font size or an average thickness, by comparing at least one of font sizes and thicknesses of the one or more detected characters, or extracts a character positioned within a predetermined distance from the one or more detected figures by measuring distances between the one or more detected characters and the one or more detected figures; and the document type analyzer determines a tag of the recognition target document based on the extracted character.

11. The apparatus for document recognition of claim 10, wherein the document type analyzer analyzes a similarity between the document feature vector of the recognition target document and a document feature vector of another recognition target document stored in advance and having a same tag as the tag of the recognition target document; and the document type analyzer stores the tag of the recognition target document and the document feature vector of the recognition target document when the similarity is less than or equal to a predetermined standard.

12. The apparatus for document recognition of claim 11, wherein the document type analyzer analyzes the similarity by giving a weight to each of document feature vectors extracted from the one or more partial images.

13. A method for document recognition, the method comprising:

analyzing a type of a recognition target document based on a document feature vector extracted from one or more partial images obtained by color space conversion of one or more partial regions of the recognition target document; and extracting value information from one or more information search images organized in a grid form based on a position of key information of the recognition target document, wherein the extracting of the value information comprises:

extracting an initial key feature vector and initial key position information by extracting a key information image from an information region for a key selected by a user:

setting a key search section based on the initial key position information; and searching for one or more pieces of key information within the key search section based on the initial key feature vector.

14. The method for document recognition of claim 13, wherein the analyzing of the type of the recognition target document includes generating one or more images for one or more partial regions by reducing the recognition target document or dividing the recognition target document with a predetermined rule, and generating the one or more partial images by applying, to each of the one or more images for the one or more partial regions, one or more color space conversion methods for performing conversion to a black-and-white image.

15. The method for document recognition of claim 13, wherein the analyzing of the type of the recognition target document includes extracting feature maps for the one or more partial images by using a convolutional neural network, and generating the document feature vector by encoding the extracted feature maps into binary strings.

16. The method for document recognition of claim 13, wherein the analyzing of the type of the recognition target document comprises:

analyzing a similarity between the document feature vector of the recognition target document and document feature vectors of one or more other recognition target documents stored in advance for each of one or more document types; and determining, as a document type of the recognition target document, a document type corresponding to a recognition target document having the highest similarity among the one or more other recognition target documents stored in advance for each of the one or more document types.

17. The method for document recognition of claim 13, wherein the extracting of the value information includes extracting an information search image for a predetermined unit of key periphery information consisting of at least one of characters, numbers, and symbols positioned in at least one of up, down, right, and left directions with respect to a position of the key information searched for within the key search section, and organizing the information search image in a grid form.

18. The method for document recognition of claim 17, wherein the extracting of the value information includes searching for key information by analyzing a similarity between the initial key feature vector and a feature vector of the key periphery information included in the information search image.

19. The method for document recognition of claim 17, wherein the extracting of the value information comprises:
extracting the value information based on format information of a value corresponding to the key selected by the user; and
the format information is an arrangement order of at least one of characters, numbers, and symbols constituting the value.

20. The method for document recognition of claim 19, wherein the extracting of the value information comprises:
extracting format information of the key periphery information included in the information search image; and
extracting the value information by comparing the extracted format information of the key periphery information with the format information of the value.

21. The method for document recognition of claim 20, wherein the extracting of the value information comprises:
searching for second key periphery information that partially matches the format information of the value by comparing another key periphery information adjacent to first key periphery information including format information that partially matches the format information of the value with the format information of the value, when the first key peripheral information is searched for; and
extracting the value information by merging the first key periphery information and the second key periphery information.

22. The method for document recognition of claim 13, wherein the analyzing of the type of the recognition target document comprises:
detecting at least one of one or more characters and one or more figures in one or more regions of the recognition target document;
extracting at least one of (i) a character of which at least one of a font size and a thickness is greater than a corresponding one of an average font size and an average thickness, by comparing at least one of font sizes and thicknesses of the one or more detected characters, and (ii) a character positioned within a predetermined distance from the one or more detected figures by measuring distances between the one or more detected characters and the one or more detected figures; and
determining a tag of the recognition target document based on the extracted character.

23. The method for document recognition of claim 22, wherein the analyzing of the type of the recognition target document comprises:
analyzing a similarity between the document feature vector of the recognition target document and a document feature vector of another recognition target document stored in advance and having a same tag as the tag of the recognition target document; and
storing the tag of the recognition target document and the document feature vector of the recognition target document when the similarity is less than or equal to a predetermined standard.

24. The method for document recognition of claim 23, wherein the analyzing of the type of the recognition target document includes analyzing the similarity by giving a weight to each of document feature vectors extracted from the one or more partial images.

* * * * *